Feb. 28, 1956 P. ADAM 2,736,831
ELECTRO-MACHINE WITH BALANCED ARMATURE REACTION
Filed Nov. 22, 1952 3 Sheets-Sheet 1

Inventor
P. Adam
By Glascock Downing Rubold
Attys

United States Patent Office 2,736,831
Patented Feb. 28, 1956

2,736,831

ELECTRO-MACHINE WITH BALANCED ARMATURE REACTION

Paul Adam, Mulhouse, France

Application November 22, 1952, Serial No. 322,067

Claims priority, application France November 22, 1951

1 Claim. (Cl. 310—268)

This invention relates to electrical machines and has particular reference to electro-machines wherein means are employed to counteract the detrimental effects of armature reaction which, according to the conventional practice, is neutralized by the provision of windings positioned externally of the armature, these armature reaction neutralizing windings being stationary relative to the field or inductive windings and fed with the current flowing through the machine to the armature windings.

It is therefore one object of this invention to provide an electro-machine wherein these known correcting or neutralizing means can be dispensed with on account of a novel armature construction wherein the reaction of this armature is reduced when current flows therethrough.

Another object of this invention is to provide an electro-machine wherein the armature carries impedance windings adapted through the action of Lenz's law to counteract the variations in magnetic flux in this armature.

Moreover, it is the object of this invention to provide an electro-machine wherein the armature, in addition to the windings through which the machine energizing current is normally caused to flow, carries on extension members located outside the inductive field a plurality of secondary windings independent of the field energizing circuit and of the circuit to which the machine is connected.

Finally, it is a further object of this invention to provide an electro-machine having rotary field windings and a stationary poleless armature.

The accompanying drawings forming part of this specification illustrate diagrammatically by way of example one form of embodiment of this invention, in this particular case an alternating current generator. In the drawings.

Figure 1:
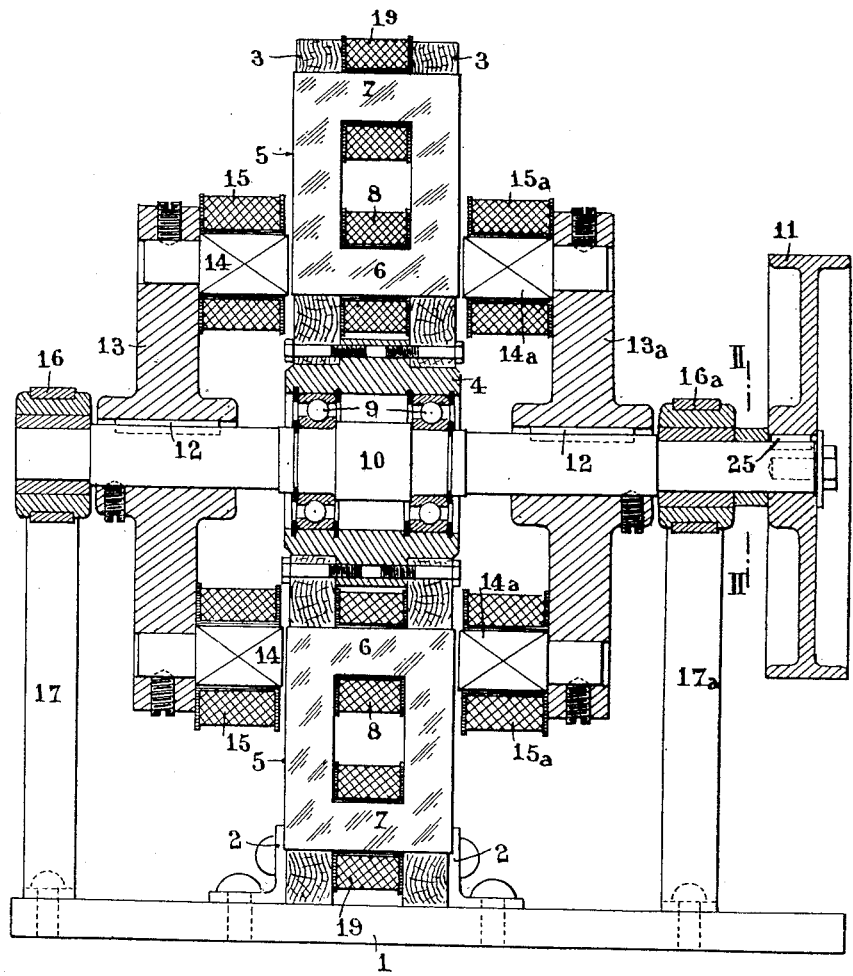
Figure 1 is an axial vertical section.
Figure 2:
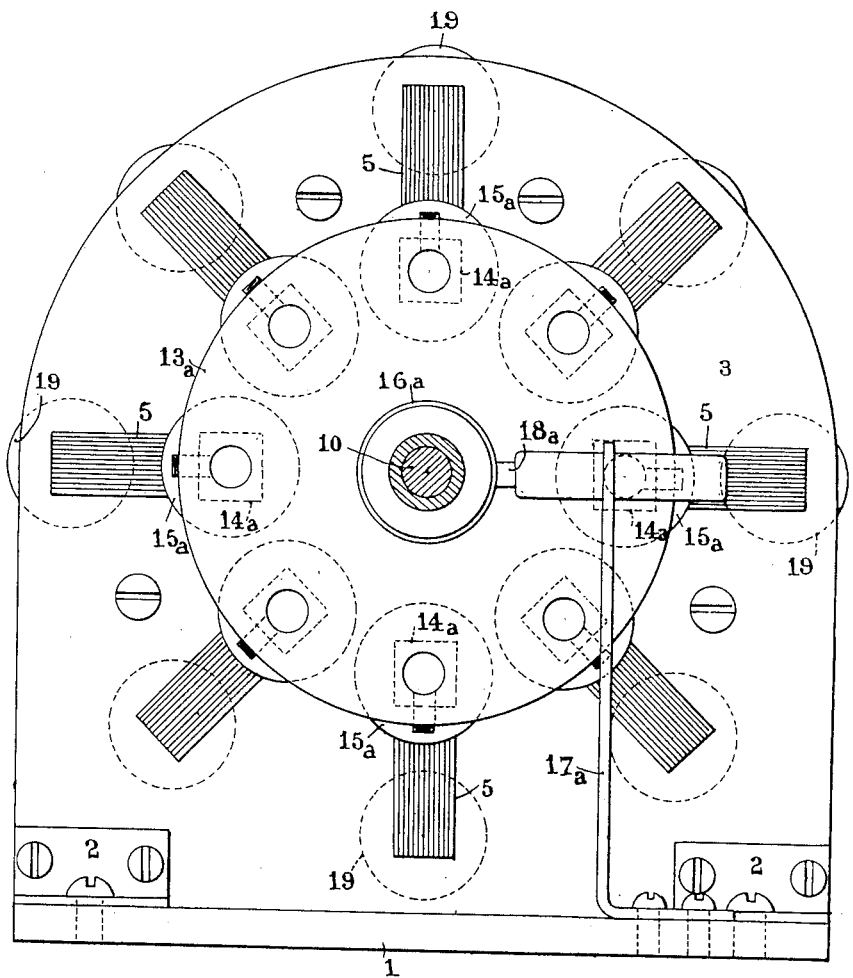
Figure 2 is a vertical section taken upon the line II—II of Fig. 1.

Referring to the drawings, on a base plate 1 is secured through angle members 2 a frame structure comprising an annular portion 3 of non-magnetic material having rigidly mounted therein a stationary hub 4 formed with a cylindrical central aperture. Rectangular soft-iron frame elements 5 are rigidly mounted on the annular portion 3 around the axis of the aforesaid cylindrical central aperture of the stationary hub 4. These frame elements 5 are positioned in radial plane with their smaller sides 6 and 7 parallel to said axis so as to form two rings coaxial thereto, i. e. an inner ring constituted by the small sides 6 and an outer ring constituted by the other small sides 7. A conductive wire 20 connected to one of the outlet terminals of the machine, in this case terminal 21, is wound successively round the small sides 6 to form windings 8 and is then connected to the other terminal 22 of the machine outlet terminals 21, 22.

Figure 3:
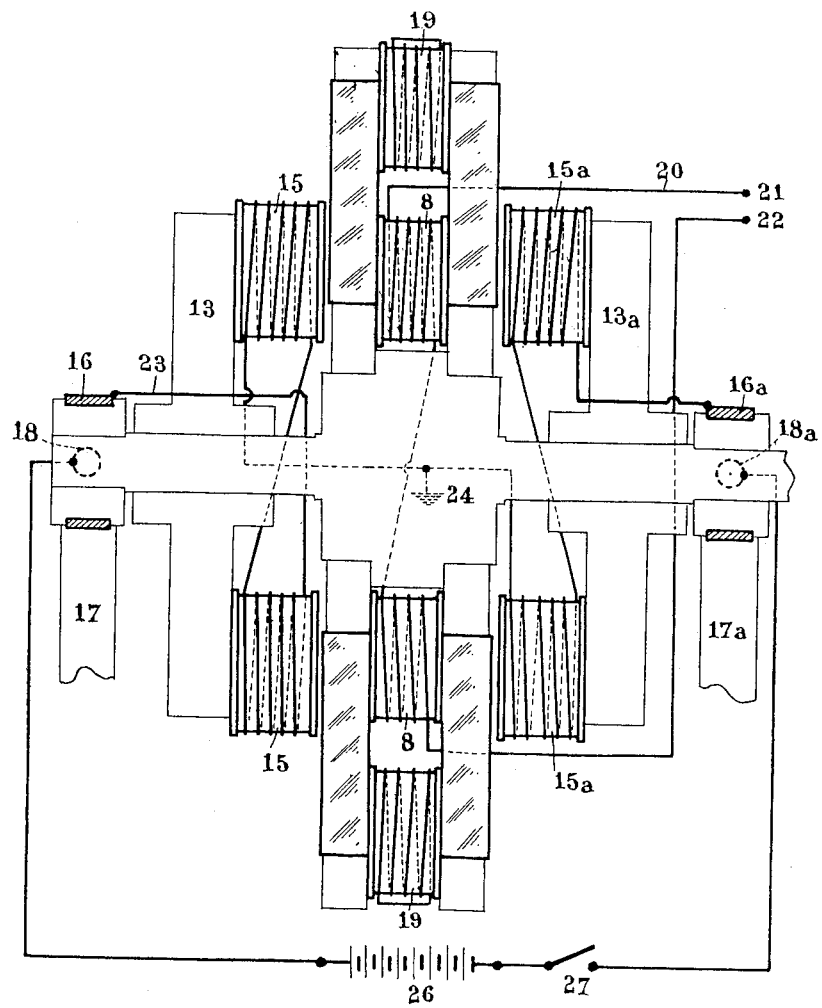
Figure 3 is a wiring diagram in connection with the embodiment exemplified in the drawings.

In ball-bearings 9 fitted in the cylindrical central aperture of the stationary hub 4 is rotatably mounted a shaft 10 having mounted thereon, through the medium of a key 25, a pulley 11. In addition, on the same shaft 10 and on either side of the annular portion 3 are mounted through the medium of keys 12 a pair of soft-iron disks 13 and 13a. Each disk carries a companion ring of soft-iron cores 14, 14a also disposed on either side of, and registering with, the inner ring constituted by the small sides 6 of the frame elements 5. On the outer side of each disk 13, 13a a pair of slip rings 16, 16a are fitted on the common shaft 10. A conductive wire 23 has one end connected to slip ring 16 and is wound successively round the associated soft-iron cores 14 to form windings 15 and after a ground connection 24 round the other set of soft-iron cores 14a to form windings 15a, this wire 23 being finally connected with its other end to the other slip ring 16a, as shown in Fig. 3. Moreover, the base plate 1 carries a pair of brackets 17, 17a each provided with a brush 18, 18a engaging the companion slip ring 16, 16a. These brushes 18, 18a are connected to the terminals of a source of direct current, for example a storage battery 26. Finally, and in accordance with a characteristic feature of this invention, the other set of small sides 7 of the frame elements 5 carry windings 19 which are simply closed or short-circuited.

If the circuit from the D.-C. source 26 is closed by actuating a switch 27 the soft-iron cores 14, 14a acting as inductive elements and forming an inductive magnetic field will be energized. If shaft 10 is rotated by means of the aforesaid pulley 11 this magnetic field will also rotate and act upon the small sides 6 carrying the primary windings 8 of the frame elements 5 constituting the armature. By varying the flux of this inductive field through the windings 8 an induced E. M. F. will be obtained in the latter which, on closing the circuit connected to the outlet terminals 21 and 22 of the machine, will produce as in any other known machines a current flowing both through these windings 8 and in this circuit. However, according to the invention, the flux induced by this current in the frame elements 5 (which is opposite to the flux variation in the inductive field and constitutes the armature reaction) is strongly reduced by the superposition of a flux of opposite direction produced in the small sides 7 of the same frame elements 5 by the closed, short-circuited windings 19. As these windings 19 are positioned outside the inductive field, they react only to this armature reaction so as to balance it in such proportions that the greater the number of turns of windings 19, the greater the balancing effect will be.

While I have herein shown and described one form in which my invention may be embodied, it will be understood that the construction thereof and the arrangement of the various parts as well as the materials used in this construction may be altered without departing from the spirit and scope thereof. Furthermore, I do not wish to be construed as limiting my invention to the specific embodiment illustrated, excepting as it may be limited in the appended claim.

What I claim is:

An electric generator comprising a stationary structure formed with a central cylindrical aperture, a plurality of oblong rectangular soft-iron frames rigidly mounted on said structure around said central aperture in planes disposed radially thereto, said frames having their smaller sides parallel to the axis of said aperture and spaced at regular angular intervals thereabout so as to form an inner annular row and an outer annular row, a pair of output terminals, a conducting wire connected to one of said terminals, said conducting wire being wound successively around said smaller sides forming said inner annular row thus forming windings carried by said smaller sides and being connected subsequently to the other terminal of said pair of output terminals, a shaft extending through said central aperture, means for rotating said shaft, a pair of soft-iron disks rotatably fast with said shaft and disposed on either side of said structure, soft-iron cores fixed to each of said discs and disposed to form annular assemblies of the same radius as the said inner annular row formed by said smaller sides of said frames, each core on one disc being opposite a core on the other disc, a pair of slip ring members rotatably fast with the said shaft, a second conducting wire connected to one of said rings, said second conducting wire being wound successively around said soft-iron cores and being connected subsequently to the other ring of said pair of rings, a source of electric current connected across said pair of rings, said source delivering direct current around said soft-iron cores and thus producing in said cores constant magnetic fluxes which pass intermittently through the said smaller sides forming the said inner annular row, thereby inducing an alternating current in the windings carried by said smaller sides, and short-circuited windings mounted around each of the said smaller sides forming said outer annular row, said short-circuited windings linking the magnetic flux induced in said frame and being energized by the current induced by said last flux.

References Cited in the file of this patent

UNITED STATES PATENTS 837,425   Seyfert _____ Dec. 4, 1906